United States Patent
Low et al.

(10) Patent No.: US 7,358,963 B2
(45) Date of Patent: Apr. 15, 2008

(54) MOUSE HAVING AN OPTICALLY-BASED SCROLLING FEATURE

(75) Inventors: Wing Kong Low, Cupertino, CA (US); Brian H. Berkeley, Saratoga, CA (US); Benjamin Bendix Lyon, Kensington, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 10/238,380

(22) Filed: Sep. 9, 2002

(65) Prior Publication Data

US 2004/0046741 A1    Mar. 11, 2004

(51) Int. Cl.
    *G06F 3/042* (2006.01)
(52) U.S. Cl. .................. 345/175; 345/163; 345/166
(58) Field of Classification Search ........ 345/173–175, 345/179, 156–158, 163–166
    See application file for complete search history.

(56) References Cited

U.S. PATENT DOCUMENTS

| | | |
|---|---|---|
| 4,110,749 A | 8/1978 | Janko et al. |
| 4,264,903 A | 4/1981 | Bigelow |
| 4,719,524 A | 1/1988 | Morishima et al. |
| 4,736,191 A | 4/1988 | Matzke et al. |
| 4,866,602 A | 9/1989 | Hall |
| 4,917,516 A | 4/1990 | Retter |
| 4,922,236 A | 5/1990 | Heady |
| 5,125,077 A | 6/1992 | Hall |
| 5,179,648 A | 1/1993 | Hauck |
| 5,186,646 A | 2/1993 | Pederson |
| 5,237,311 A | 8/1993 | Mailey et al. |
| D349,280 S | 8/1994 | Kaneko |
| 5,339,213 A | 8/1994 | O'Callaghan |
| 5,355,148 A * | 10/1994 | Anderson .................. 345/166 |
| 5,404,152 A | 4/1995 | Nagai |
| 5,414,445 A | 5/1995 | Kaneko et al. |
| D362,431 S | 9/1995 | Kaneko et al. |
| 5,473,343 A | 12/1995 | Kimmich et al. |
| 5,473,344 A | 12/1995 | Bacon et al. |
| 5,495,566 A | 2/1996 | Kwatinetz |
| 5,528,265 A | 6/1996 | Harrison |
| 5,559,943 A | 9/1996 | Cyr et al. |
| 5,561,445 A | 10/1996 | Miwa et al. |
| 5,565,887 A | 10/1996 | McCambridge et al. |
| 5,578,817 A | 11/1996 | Bidiville et al. |

(Continued)

FOREIGN PATENT DOCUMENTS

DE        4125049        1/1992

(Continued)

OTHER PUBLICATIONS

"System Service and Troubleshooting Manual", www.dsplib.com/intv/Master, downloaded Dec. 11, 2002.

(Continued)

*Primary Examiner*—Richard Hjerpe
*Assistant Examiner*—Kimnhung Nguyen
(74) *Attorney, Agent, or Firm*—Beyer Weaver LLP (57) ABSTRACT

A peripheral input device for controlling movements on a display screen. The peripheral input device includes a housing and an optical touch pad carried by the housing. The optical touch pad is configured to translate finger motion into movements on the display screen.

46 Claims, 7 Drawing Sheets

U.S. PATENT DOCUMENTS

| | | |
|---|---|---|
| 5,585,823 A | 12/1996 | Duchon et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| D382,550 S | 8/1997 | Kaneko et al. |
| 5,661,505 A | 8/1997 | Livits |
| D385,542 S | 10/1997 | Kaneko et al. |
| 5,686,720 A | 11/1997 | Tullis |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,786,804 A | 7/1998 | Gordon |
| 5,786,818 A | 7/1998 | Brewer et al. |
| 5,812,114 A | 9/1998 | Loop |
| 5,825,353 A | 10/1998 | Will |
| 5,828,364 A | 10/1998 | Siddiqui |
| 5,838,304 A | 11/1998 | Hall |
| 5,841,425 A | 11/1998 | Zenz |
| 5,841,426 A | 11/1998 | Dodson et al. |
| D402,281 S | 12/1998 | Ledbetter et al. |
| 5,850,213 A | 12/1998 | Imai et al. |
| 5,856,822 A | 1/1999 | Du et al. |
| 5,889,236 A | 3/1999 | Gillespie et al. |
| 5,903,229 A | 5/1999 | Kishi |
| 5,907,152 A | 5/1999 | Dändliker et al. |
| 5,907,318 A | 5/1999 | Medina |
| 5,909,211 A | 6/1999 | Combs et al. |
| 5,914,706 A | 6/1999 | Kono |
| 5,956,019 A | 9/1999 | Bang et al. |
| 5,959,611 A | 9/1999 | Smailagic et al. |
| 5,982,302 A | 11/1999 | Ure |
| 5,991,431 A | 11/1999 | Borza et al. |
| 5,999,166 A | 12/1999 | Rangan |
| 6,002,389 A | 12/1999 | Kasser et al. |
| 6,005,299 A | 12/1999 | Hengst |
| 6,031,518 A | 2/2000 | Adams et al. |
| 6,064,370 A | 5/2000 | Wang et al. |
| 6,075,533 A | 6/2000 | Chang |
| 6,084,574 A | 7/2000 | Bidiville |
| 6,111,563 A | 8/2000 | Hines |
| 6,115,028 A | 9/2000 | Balakrishnan et al. |
| 6,124,587 A | 9/2000 | Bidiville et al. |
| 6,128,006 A | 10/2000 | Rosenberg et al. |
| 6,130,664 A | 10/2000 | Suzuki |
| 6,163,312 A | 12/2000 | Furuya |
| 6,166,721 A | 12/2000 | Kuroiwa et al. |
| 6,181,322 B1 | 1/2001 | Nanavati |
| 6,188,389 B1 | 2/2001 | Yen |
| 6,188,393 B1 | 2/2001 | Shu |
| 6,191,774 B1 | 2/2001 | Schena et al. |
| 6,198,473 B1 | 3/2001 | Armstrong |
| 6,211,861 B1 | 4/2001 | Rosenberg et al. |
| 6,219,038 B1 | 4/2001 | Cho |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| D443,616 S | 6/2001 | Fisher et al. |
| 6,243,078 B1 | 6/2001 | Rosenberg |
| 6,256,011 B1 | 7/2001 | Culver |
| 6,262,717 B1 | 7/2001 | Donohue et al. |
| 6,266,050 B1 | 7/2001 | Oh et al. |
| 6,297,795 B1 | 10/2001 | Kato et al. |
| 6,323,843 B2 | 11/2001 | Giles et al. |
| 6,323,845 B1 | 11/2001 | Robbins |
| 6,333,734 B1 | 12/2001 | Rein |
| 6,340,800 B1 | 1/2002 | Zhai et al. |
| D454,568 S | 3/2002 | Andre et al. |
| 6,356,524 B2 | 3/2002 | Aratani |
| 6,369,797 B1 | 4/2002 | Maynard |
| 6,373,470 B1 | 4/2002 | Andre et al. |
| 6,377,530 B1 | 4/2002 | Burrows |
| 6,392,632 B1 * | 5/2002 | Lee ............................ 345/158 |
| 6,392,634 B1 | 5/2002 | Bowers et al. |
| 6,392,636 B1 | 5/2002 | Ferrari et al. |
| 6,433,780 B1 | 8/2002 | Gordon et al. |
| 6,469,693 B1 | 10/2002 | Chiang et al. |
| 6,489,947 B2 * | 12/2002 | Hesley et al. ................ 345/163 |
| 6,505,088 B1 * | 1/2003 | Simkin et al. ................. 700/85 |
| 6,513,717 B2 | 2/2003 | Hannigan |
| 6,545,665 B2 | 4/2003 | Rodgers |
| 6,559,830 B1 | 5/2003 | Hinckley et al. |
| 6,587,093 B1 | 7/2003 | Shaw et al. |
| 6,636,197 B1 | 10/2003 | Goldenberg et al. |
| 6,639,584 B1 | 10/2003 | Li |
| 6,650,975 B2 | 11/2003 | Ruffner |
| 6,677,927 B1 | 1/2004 | Bruck et al. |
| 6,686,904 B1 | 2/2004 | Sherman et al. |
| 6,703,550 B2 | 3/2004 | Chu |
| 6,703,599 B1 * | 3/2004 | Casebolt et al. ............. 250/221 |
| 6,707,027 B2 * | 3/2004 | Liess et al. ................. 250/221 |
| 6,717,569 B1 | 4/2004 | Gruhl et al. |
| 6,724,366 B2 | 4/2004 | Crawford |
| 6,724,817 B1 | 4/2004 | Simpson et al. |
| 6,727,889 B2 | 4/2004 | Shaw |
| 6,738,045 B2 | 5/2004 | Hinckley et al. |
| 6,740,860 B2 * | 5/2004 | Kobayashi ................ 250/214.1 |
| 6,762,751 B2 * | 7/2004 | Kuan ........................ 345/166 |
| 6,791,533 B2 | 9/2004 | Su |
| 6,795,056 B2 * | 9/2004 | Norskog et al. ............. 345/158 |
| 6,795,057 B2 | 9/2004 | Gordon |
| 6,816,150 B2 * | 11/2004 | Casebolt et al. ............. 345/166 |
| 6,828,958 B2 | 12/2004 | Davenport |
| 6,833,825 B1 * | 12/2004 | Farag et al. ................. 345/158 |
| 6,844,871 B1 | 1/2005 | Hinckley et al. |
| 6,844,872 B1 | 1/2005 | Farag et al. |
| 6,848,014 B2 | 1/2005 | Landron et al. |
| 6,865,718 B2 | 3/2005 | Levi |
| 6,950,094 B2 * | 9/2005 | Gordon et al. ............... 345/166 |
| 6,995,744 B1 * | 2/2006 | Moore et al. ................ 345/156 |
| 7,046,230 B2 | 5/2006 | Zadesky et al. |
| 7,051,291 B2 | 5/2006 | Sciammarella et al. |
| 7,119,792 B1 | 10/2006 | Andre et al. |
| 7,164,412 B2 | 1/2007 | Kao |
| 7,168,047 B1 | 1/2007 | Huppi |
| 7,170,488 B2 * | 1/2007 | Kehlstadt et al. ............ 345/157 |
| 7,233,318 B1 | 6/2007 | Farag |
| 7,239,800 B2 | 7/2007 | Bilbrey |
| 2001/0011991 A1 | 8/2001 | Wang et al. |
| 2001/0050673 A1 | 12/2001 | Davenport |
| 2001/0051046 A1 | 12/2001 | Watanabe et al. |
| 2002/0063688 A1 | 5/2002 | Shaw et al. |
| 2002/0093487 A1 * | 7/2002 | Rosenberg .................. 345/166 |
| 2002/0130839 A1 * | 9/2002 | Wallace et al. ............. 345/157 |
| 2002/0130841 A1 | 9/2002 | Scott |
| 2002/0154090 A1 | 10/2002 | Lin |
| 2003/0043121 A1 | 3/2003 | Chen |
| 2003/0050092 A1 | 3/2003 | Yun |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0098851 A1 | 5/2003 | Brink |
| 2003/0107551 A1 | 6/2003 | Dunker |
| 2003/0107552 A1 | 6/2003 | Lu |
| 2003/0184517 A1 | 10/2003 | Senzui et al. |
| 2004/0046741 A1 | 3/2004 | Low et al. |
| 2004/0239622 A1 | 12/2004 | Proctor et al. |
| 2004/0242269 A1 | 12/2004 | Fadell |
| 2004/0252109 A1 | 12/2004 | Trent et al. |
| 2005/0084138 A1 | 4/2005 | Inkster et al. |

| | | | |
|---|---|---|---|
| 2005/0110768 | A1 | 5/2005 | Marriott et al. |
| 2005/0228320 | A1 | 10/2005 | Klinghult |
| 2005/0259077 | A1* | 11/2005 | Adams et al. .............. 345/163 |

FOREIGN PATENT DOCUMENTS

| | | |
|---|---|---|
| DE | 19722636 | 12/1998 |
| DE | 10022537 | 11/2000 |
| DE | 10201193 | 7/2003 |
| EP | 0 498 540 A2 | 1/1992 |
| EP | 0653725 | 5/1995 |
| EP | 0768619 | 4/1997 |
| EP | 0795837 | 9/1997 |
| EP | 0 880 Q91 A2 | 11/1998 |
| EP | 1 026 713 A1 | 8/2000 |
| JP | 03/237520 | 10/1991 |
| JP | 07-319001 | 12/1995 |
| JP | 63106826 A1 | 5/1998 |
| JP | 10326149 A | 12/1998 |
| JP | 11-194863 | 7/1999 |
| JP | 11-194872 | 7/1999 |
| JP | 11-194883 | 7/1999 |
| JP | 2000-215549 | 8/2000 |
| JP | 2000242424 | 9/2000 |
| JP | 2001-051790 | 2/2001 |
| JP | EP 1241558 | 9/2002 |
| JP | 2003280807 | 2/2003 |
| TW | 431607 | 4/2001 |
| WO | WO 90/05972 | 5/1990 |
| WO | WO 94/17494 | 8/1994 |
| WO | WO 98/14863 | 4/1998 |
| WO | WO 99/26330 | 5/1999 |
| WO | WO 99/49443 | 9/1999 |
| WO | WO 00/39907 | 7/2000 |
| WO | WO 02052494 | 7/2002 |
| WO | WO 03077110 | 9/2003 |
| WO | WO 2006/132817 | 12/2006 |

OTHER PUBLICATIONS

Apple Computer, Inc., "Apple Pro Mouse," Jul. 2000, Apple Pro Mouse Design Innovations product specification, pp. 1-11.

David Nagel, "More Details on the New Pro Keyboard and ButtonLess Mouse," Jul. 2000, http://www.creativemac.com/HTM/News/07_00/detailskeyboardmouse,htm pp. 1-2.

John Siracusa, "MacWorld Expo NY 2000,"Jul. 2000, http://www.arstechnic.com/wanderdesk/3q00/macworld2k/mwny-2.html pp. 1-6.

Microsoft Inc. et al., "Scroll and Zoom on Microsoft Excel Sheet by Using the Microsoft Intellimouse Pointing Device", 1999, pp. 1-3.

U.S. Appl. No. 10/157,343, entitled "Mouse Having a Buttonless Panning and Scrolling Switch", filed May 28, 2002.

"About Quicktip®" www.logicad3d.com/docs/qt.html, downloaded Apr. 8, 2002.

"QEM Touchpad Modules" website www.glidepoint.com/sales/modules.index.shtml, downloaded Feb. 13, 2002.

"Product Overview—ErgoCommander®", www.logicad3d.com/products/ErgoCommander.htm, downloaded Apr. 8, 2002.

"Product Overview—SpaceMouse® Classic", www.logicad3d.com/products/Classic.htm, downloaded Apr. 8, 2002.

Sylvania, "Intellivision™ Intelligent Television Master Component Service Manual," pp. 1, 2 and 8, 1979.

Gadgetboy, "Point and click with the latest mice", CNETAsia Product Review, www.asia.cnet.com/reviews...are/gadgetboy/0,39001770,38023590,00.htm, downloaded Dec. 5, 2001.

Tessler et al. "Touchpads Three new input devices", website www.macworld.com/1996/02/review/1806.html, download Feb. 13, 2002.

"Synaptics Tough Pad Interfacing Guide" Second Edition, Mar. 25, 1998, Synaptics, Inc. San Jose, CA, pp. 1 to 90.

Fiore, Andrew, "Zen Touchpad", Cornell University, May 2000.

Flaminio, Michael, "IntelliMouse Explorer", IGM Review, Oct. 4, 1999.

Grevstad, Eric, "Microsoft Wireless IntelliMouse Explorer Review The Ultimate Pointing Machine", HardwareCentral Review, Jun. 24, 2003.

Grevstad, Eric, "Microsoft Wireless IntelliMouse Explorer Review The Ultimate Pointing Machine", HardwareCentral Review, Oct. 9, 2001.

Dreier, Troy, "The Comfort Zone", PC Magazine, Mar. 12, 2002.

U.S. Appl. No. 10/654,108, filed Sep. 2, 2003.

U.S. Appl. No. 29/231,465, filed Jun. 3, 2005.

U.S. Appl. 60/364,400, filed Mar. 13, 2002 (expired).

"Apple Unveils Optical Mouse and New Pro Keyboard," Press Release, Jul. 19, 2000.

"Der Klangmeister," Connect Magazine, Aug. 1998.

Bang & Olufsen Telecom a/s, "BeoCom 6000 User Guide 2000".

BeoCom 6000, Sales Training Brochure, date unknown.

Chapweske, Adam, "PS/2 Mouse/Keyboard Protocol", 1999, http://panda.cs.ndsu.nodak.edu/~achapwes/PICmicro/PS2/ps2.htm.

De Meyer, Kevin, Crystal Optical Mouse, Feb. 14, 2002, Heatseekerz, Web Article 19.

Ken Hinckley et al. "Touch-Sensing Input Devices" CHI 1999 pp. 223-230.

Letter re: Bang & Olufsen A/S, by David Safran, Nixon Peabody, LLP, May 21, 2004.

Photographs of Innovations 2000 Best of Show award presented at the 2000 International CES Innovations 2000 Design & Engineering Showcase, 1 pg.

International Search Report from related application No. PCT/US2006/020341 dated Jun. 12, 2007.

EPO Form 1507 in related EP Application No. 02761784.4 dated Nov. 19, 2004.

"Neuros MP3 Digital Audio Computer", www.neurosaudio.com, downloaded Apr. 9, 2003.

* cited by examiner

MOUSE HAVING AN OPTICALLY-BASED SCROLLING FEATURE

BACKGROUND OF THE INVENTION

1. Field of the Invention

The present invention relates generally to an input device for use in a computer system. More particularly, the present invention relates to a mouse having an optically-based scrolling feature.

2. Description of the Related Art

Most computer systems, as for example general purpose computers such as portable computers and desktop computers, receive input from a user via an input device such as a mouse. As is generally well known, the mouse allows a user to move an input pointer (e.g., cursor) and to make selections with respect to a graphical user interface (GUI) on a display screen. The mouse typically includes a trackball or optical sensor (located at the bottom side of the mouse) for translating the motion of the users hand into signals that the computer system can use. For example, by positioning the mouse on a desktop and moving it thereon, the user can move an input pointer or cursor in similar directions within the GUI. The mouse also conventionally includes one or more buttons, which are located on the top side of the mouse. These one or more buttons, when selected, can initiate a GUI action such as menu or object selections. The one or more buttons are typically provided by one or more button caps that move relative to the housing (e.g., through an opening in the housing).

Recently, a scroll wheel has been added to the mouse to give the user scrolling functionality. The scroll wheel saves time and steps, and allows a user to move through documents by physically rolling the wheel forward or backward-instead of clicking on the scroll bar displayed on the GUI. In the past, scrolling was implemented by selecting the scroll bar with the mouse, and moving the scroll bar on the GUI by moving the mouse up or down. A switch has also been incorporated into some mice for changing the mouse from a cursor control device to a scroll control device. In cursor control mode, mouse movements control cursor movements, and in scroll control mode, mouse movements control scroll movements. In most cases, the scroll wheel and switch require a separate mechanical component for actuating the scrolling feature. These devices also generally require the mechanical component to be mounted in the mouse with portions of it protruding out of the mouse housing to allow a user's finger access, i.e., the housing includes a cut out to allow the mechanical component to protrude therethrough.

Although mice designs such as those described above work well, there are continuing efforts to improve their form, feel and functionality. For example, it would be desirable to provide an improved scrolling feature for a mouse that is aesthetically pleasing to the user. As should be appreciated, the scroll wheel is not aesthetically pleasing since it protrudes above the mouse housing, i.e., breaks the surface of the mouse. Furthermore, the scroll wheel of the mouse can only be manipulated in one direction, and thus the use of the scroll wheel becomes counter intuitive when scrolling in a different direction in the GUI, as for example directions that are orthogonal thereto. In addition, it would be desirable to provide an improved scrolling feature for a mouse that allows the mouse to scroll directly without holding down or physically moving a wheel, button, switch or the like.

SUMMARY OF THE INVENTION

The invention relates, in one embodiment, to a peripheral input device for controlling movements on a display screen. The peripheral input device includes a housing and an optical touch pad carried by the housing. The optical touch pad is configured to translate finger motion into movements on the display screen.

The invention relates, in another embodiment, to a mouse having a finger actuated scrolling region that is integrated into a housing of the mouse. The scrolling region represents the working area of an optical system disposed inside the housing. The optical system is configured to detect finger movement across the scrolling region.

The invention relates, in another embodiment, to a mouse for use in a computer system having a display screen. The mouse includes a first position detection mechanism configured to track the position of a finger moving across an outer surface of the mouse and to generate signals for controlling movements on the display screen. The mouse also includes a second position detection mechanism configured to track the position of the mouse moving across a surface and to generate signals for controlling movements on the display screen.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1-8. However, those skilled in the art will readily appreciate that the detailed description given herein with respect to these figures is for explanatory purposes as the invention extends beyond these limited embodiments.

Figure 1:
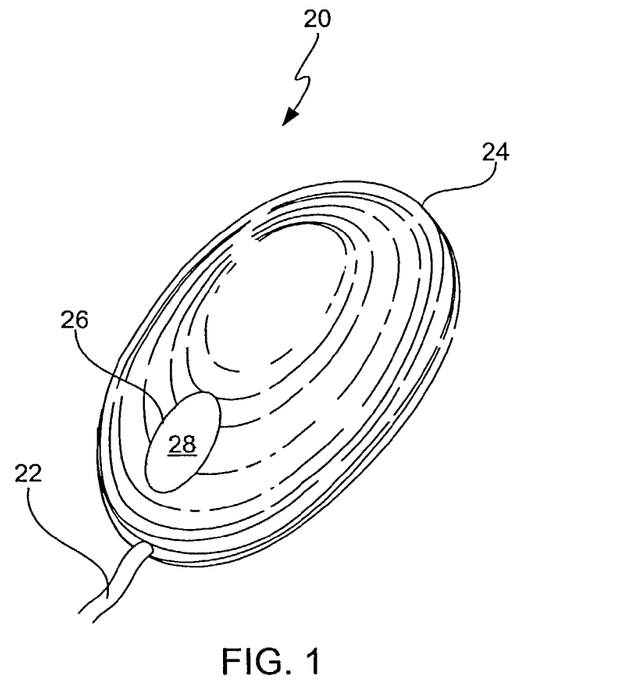
FIG. 1 is a perspective diagram of a peripheral input device, in accordance with one embodiment of the present invention.

FIG. 1 is a perspective diagram of a peripheral input device 20, in accordance with one embodiment of the invention. By peripheral input device 20, it is meant a device that is capable of connecting and sending information to a host system such as a computer system. As shown, the peripheral input device 20 includes a cable 22 for connecting to the host system. Alternatively, a radio frequency (RF) link or optical infrared (IR) link may be used in order to eliminate the cable. The peripheral input device 20 is generally configured to implement one or more tasks (e.g., specific functions) in the host system. For example, the peripheral input device may be used to control movements and/or perform actions on a display screen of the host system (e.g., via a graphical user interface).

The peripheral input device 20 shown in FIG. 1 includes a housing 24 that provides a structure for gripping the device during use thereof (e.g., handheld). The housing 24 also provides a structure for enclosing, containing and/or supporting the internal components of the peripheral input device 20. By way of example, the internal components may correspond to circuitry capable of processing/sending user inputs to the host system. The housing 24 also helps to define the shape or form of the peripheral input device 20. That is, the contour of the housing 24 embodies the outward physical appearance of the peripheral input device 20. The contour may be rectilinear, curvilinear or both.

The peripheral input device 20 generally includes a touch pad 26. The touch pad 26 is configured to provide positional data to the host system so as make movements on a display screen (e.g., via a graphical user interface). The positional data is generally produced when a hand or finger (or other object) is moved across the surface of the touch pad 26. By way of example, the positional data may be used to control the movement of a cursor/pointer on the display screen or to scroll or pan through the display screen. Additionally or alternatively, the optical touch pad 26 may provide command data to the host system so as implement tasks in the host system. The command data may be produced when a finger taps the surface of the touch pad 26. By way of example, the command data may be used to select an item on the screen, open a file or document, execute instructions, start a program, view a menu, and/or the like.

In one embodiment, the touch pad 26 corresponds to an optical touch pad. By optical touch pad, it is meant a touch pad that is based on optical technologies rather than conventional technologies such as capacitive technologies. The optical touch pad may be widely varied. For example, it may be a separate device that is positioned within the housing 24 or it may be an integrated device that uses a portion of the housing 24 to form the optical touch pad 26. In either case, the optical touch pad 26 generally includes an optically operable window and one or more optical sensors that monitor the position of a finger (or other object) as it is moved across the optically operable window, i.e., the sensors work through the optically operable window. By way of example, the optically operable window may be formed from a translucent or semi-translucent material. In the illustrated embodiment, the optical touch pad 26 is an integrated device such that the optical sensors are located within the housing 24, and at least a portion of the housing 24 serves as the optically operable window, i.e., the optical sensors work through a optically operable portion of the housing 24. The optically operable portions may form the entire housing 24 or only a small portion of the housing 24 (or anywhere therebetween). In one embodiment, the housing includes a top member and a bottom member, of which at least the entire top member serves as an optically operable window. The working area of the optical sensors generally defines one or more movement sensitive areas 28 within the optically operable window. By movement sensitive areas 28, it is meant the regions of the housing 24 that are used by a user to activate the optical touch pad 26 in order to implement actions (movements, commands) on the display screen. For example, by moving their finger over or on the region of the housing 24.

The optical sensors may be widely varied. For example, the optical sensors may correspond to camera like devices that capture images of the changing surface as the finger moves thereby or light detectors that measure the intensity of light reflecting off the finger as the finger moves over the surface of the housing. In each of these examples, the optical sensors are generally coupled to a controller that interprets the data collected by the optical sensors. For example, the controller may correspond to an application specific integrated circuit and/or a micro processor configured to compute the position, speed and direction of finger movement based on the signals produced by the optical sensors. The controller may also be configured to report this information to the host system.

The position of the movement sensitive areas 28 relative to the housing 24 may be widely varied. For example, the movement sensitive areas 28 may be positioned almost anywhere (e.g., top, side, front, or back) on the housing 24 so long as they are accessible to a user during manipulation of the device 20. In the illustrated embodiment, the movement sensitive areas 28 are positioned in middle front portion of the housing 24. This allows a user to actuate GUI movements by moving his/her index finger across the movement sensitive areas 28. As should be appreciated, the sides of the device 20 are generally gripped by the thumb and ring/pinky fingers. The number of movement sensitive areas 28 may also be widely varied. That is, although only one movement sensitive area 28 is shown in FIG. 1, it should be noted that a plurality of movement sensitive areas may be used. In addition, the shape of the movement areas may be widely varied. For example, they may be circles, triangles, squares, rectangles or any other known shape or they may be complex or random shapes such as an apple. In the illustrated embodiment, the movement area is shaped as an oval.

Although not shown, the peripheral input device 20 may also include one or more buttons that provide a clicking action for performing actions on the display screen. By way of example, the actions may include selecting an item on the screen, opening a file or document, executing instructions, starting a program, viewing a menu, and/or the like. The buttons may be widely varied. For example, the buttons may be mechanical buttons that are disposed through an opening in the housing 24 or a unified button/housing that incorporates the functionality of a button (or buttons) directly into the housing 24. The buttons of the peripheral input device 20 may also be a combination of the above (e.g., mechanical buttons and unified button housing). In the illustrated embodiment, the clicking action is provided by a unified button housing and thus there are no separate mechanical buttons. By way of example, a description of unified button housings may be found in commonly owned U.S. Pat. No. 6,373,470 and patent application Ser. No. 10/060,712, which are herein incorporated by reference.

Additionally, the peripheral input device 20 may include a position detection mechanism for performing additional movements on the display screen (e.g., by providing positional data to the host). Examples of position detection mechanisms, which may be used, are optical arrangements, trackball arrangements, joystick arrangements, touch pads arrangements and the like. The position detection mechanism may provide functionality similar to the touch pad 26. For example, the touch pad as well as the position detection mechanisms may be used to perform cursor movements or scroll movements. The position detection mechanism may also provide functionality that is different than the touch pad 26. For example, the touch pad 26 may provide scroll control while the position mechanism may provide cursor control. In cases such as this, the movement sensitive areas 28 of the touch pad 26 may be referred to as scrolling or panning regions.

In one embodiment, the position detection mechanism provides positional data corresponding to movements of the housing 24 when its moved across the surface (e.g., a desktop). By way of example, the position detection mechanism may correspond to a trackball or an optical sensor arrangement, both of which are commonly used in mice. In this embodiment, the housing 24 generally provides additional structure for moving the device 20 along a surface and for gripping the device 20 for movement thereof. Further, the position detection mechanism is generally positioned on the bottom side of the device (rather than on the top side where the touch pad, i.e., movement sensitive areas, are located). In one implementation, a bottom side of the housing has an external contour that substantially conforms to the contour of a flat surface such as a desktop and a top side of the housing has an external contour that substantially conforms to the contour of the inside surface of a hand.

Figure 2:
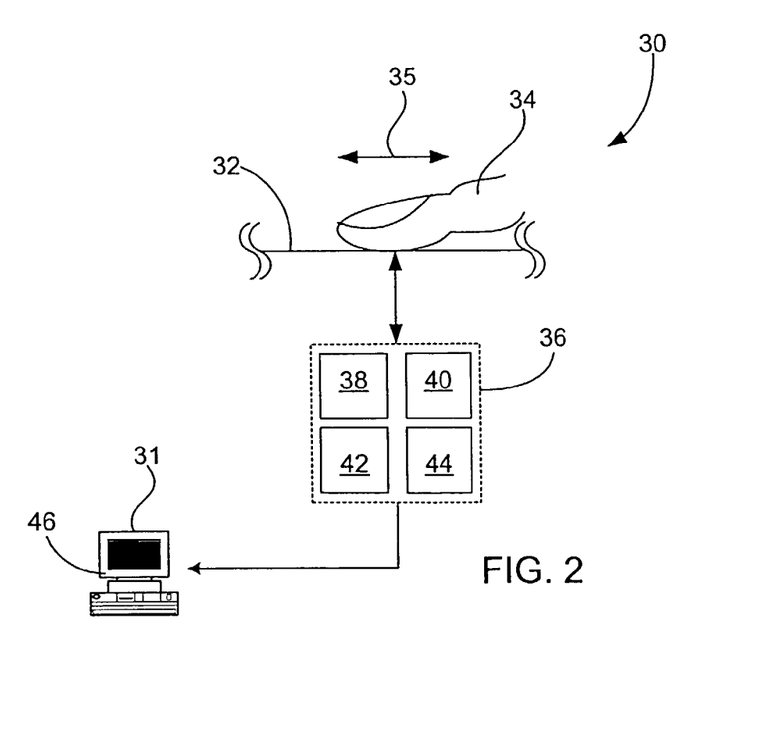
FIG. 2 is a simplified diagram of an optical touch pad, in accordance with one embodiment of the present invention.

FIG. 2 is a simplified diagram of an optical touch pad 30, in accordance with one embodiment of the present invention. The optical touch pad 30 may be a stand alone device or be integrated with other devices. For example, the optical touch pad 30 may be placed in an input device such as a keyboard, mouse or other peripheral input device such as the peripheral input device shown in FIG. 1. In addition, it may be placed in a portable device such as a laptop computer, cellular phone, media player, PDA or the like. In the illustrated embodiment, the optical touch pad 30 is part of a peripheral input device that is connected to a host system 31. By way of example, the host system may be a computer system such as a conventional computer system that includes a general purpose computer and a display.

As shown, the optical touch pad 30 includes an active surface 32 for receiving moving inputs from a finger 34. The moving inputs are shown by arrow 35. The active surface 32 is configured to cooperate with an optical assembly 36 that includes one or more optical sensors 38. The optical sensors 38 are configured to optically detect the position of the finger 34 as its moved over the active surface 32. The optical assembly 36 may also include one or more light sources 40 that cooperate with the one or more optical sensors 38, i.e., the light source 40 generates light that is used by the sensors 38 to process finger movements. The optical assembly 36 may also include one or more optical components 42 that help direct the light between the light source and the optical sensors. By way of example, the optical components may include lens, mirrors, prisms, and the like.

In general, when an object (e.g., finger 34) approaches the active surface 32, a position signal is generated by the optical sensors. Moreover, when an object is moved across the active surface 32, multiple position signals are generated by the optical sensors 38. The multiple position signals may be used to determine the direction, position, speed and acceleration of the object as its moved around the active surface 32. In one embodiment, the optical sensor 38 is a camera or image acquisition like device that takes multiple pictures of the finger as its moved and produces signals based on the changing pictures. For example, as the finger 34 is moved, the different pictures show the finger 34 at various points within the field of view of the camera. In this embodiment, the light source 40 serves to provide light in the field of view of the camera. In another embodiment, the optical sensor 38 is a plurality of light detectors, each of which measures the intensity of light as its reflected off the finger 34. The light is produced via the light source 40. Each finger position produces a different light intensity at each of the detectors and thus the finger position may be determined from the varying signals produced by the light detectors. In most cases, the spectrum of light outputted by the light source is balanced with the optical sensor, i.e., they are optically matched so as to provide a more efficient coupling between the light source and sensor.

The optical assembly may also include a control assembly 44 that interprets the data collected by the optical sensors 38. For example, the control assembly 44 may monitor the signals produced by the sensors 38 and compute the position, speed and direction of finger movement based on the processed signals. The control assembly 44 may also report this information to the host system 31 so that it can be used to move a cursor or scroll through a display screen 46. By way of example, the control assembly 44 may include an application specific integrated circuit and/or a processor. In one implementation, the application specific integrated circuit processes the data from the sensors and outputs quadrature signals based on the data to the processor, and the processor processes the quadrature signals and outputs positional data to a host device. For example, the processor may output the positional data (e.g., X and Y) via a universal serial bus (USB).

Although not shown, the optical assembly may also include a buzzer to provide audio feedback to a user. The audio feedback can, for example, be a clicking sound produced by the buzzer. In one embodiment, the buzzer is a piezo-electric buzzer. In most cases, the clicking sounds provide audio feedback to the user at the rate at which the finger is moved across the active surface. The number of clicking sounds per unit time increases the faster the movement, and the clicking sounds per unit time decreases the slower the movement. The buzzer is typically controlled by the control assembly.

Moreover, the active surface may include a tactile features, which provide tangible surfaces that help the user manipulate the touch pad. For example, the tactile feature may define the boundary of the active surface. The tactile features may be widely varied. For example, the tactile features may be bumps, lips, recesses, cavities and/or the like. The tactile features should be least obtrusive surface as possible while still allowing the user to feel or view the boundary. In most cases, the tactile features 62 are disposed around the outer periphery of the active surface. This configuration informs the user where the edge of the active surface is when using the touch pad. Alternatively, the boundary may be printed so that it is viewed rather than felt.

FIGS. 3A-3F are diagrams of a peripheral input device 50 being manipulated by a hand 52 of a user, in accordance with several embodiments of the present invention. By way of example, the peripheral input device 50 may generally correspond to the peripheral input device 20 shown in FIG. 1. The peripheral input device 50 is generally configured to provide both cursor and scroll control. In particular, movement of the peripheral input device 50 along a surface 54 controls the movement of a cursor, and movement of a finger 56 along the surface of the peripheral input device 50 controls a scrolling movement. As shown, the peripheral input device 50 includes an optical touch pad that is integrated into the top portion 58 of the housing 60 and a second position detection mechanism 62 that is positioned at the bottom portion 64 of the housing 60. The optical touch pad defines a scrolling region 66 on the housing 60 so as to allow a user to control scroll movements, i.e., movement of a finger thereover actuates scrolling on a display screen. The position detection mechanism 62, on the other hand, monitors the position of the housing 60 so as to allow a user to control cursor movements, i.e., movement of the housing over a surface actuates cursor movements on the display screen.

The term "scrolling" as used herein generally pertains to moving displayed data or images (e.g., text or graphics) across a viewing area on a display screen so that a new set of data or image (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, scrolling allows a user to view consecutive sets of data currently outside of the viewing area. The viewing area may be the entire viewing area of the display screen or it may only be a portion of the display screen (e.g., a window frame). By way of example, the scrolling may be used to help perform internet browsing, spreadsheet manipulation, viewing code, computer aided design, and the like.

In one embodiment, vertical scrolling is implemented when a finger is moved across the scrolling region in a first direction, as for example, from front to back or back to front. This particular embodiment is shown in FIGS. 3A-3D. In the case of vertical scrolling, when a user scrolls (or pans) down, each new set of data appears at the bottom of the viewing area and all other sets of data move up one position. If the viewing area is full, the top set of data moves out of the viewing area. Similarly, when a user scrolls (or pans) up, each new set of data appears at the top of the viewing area and all other sets of data move down one position. If the viewing area is full, the bottom set of data moves out of the viewing area. In another embodiment, horizontal scrolling is implemented when the finger is moved across the scrolling region in a second direction, as for example, from left to right or from right to left. This particular embodiment is shown in FIGS. 3E-3F. In the case of horizontal scrolling, when a user scrolls (or pans) to the side, each new set of data appears at the side of the viewing area and all other sets of data move to the side one position. If the viewing area is full, the outer most (right or left) set of data moves out of the viewing area. Similarly, when a user scrolls (or pans) to the opposite side, each new set of data appears at the side of the viewing area and all other sets of data move to the side one position. If the viewing area is full, the outer most set of data moves out of the viewing area. As should be appreciated, the above embodiments provide an intuitive way to scroll since the direction of the moving finger corresponds to the direction of scrolling.

Figure 3A:
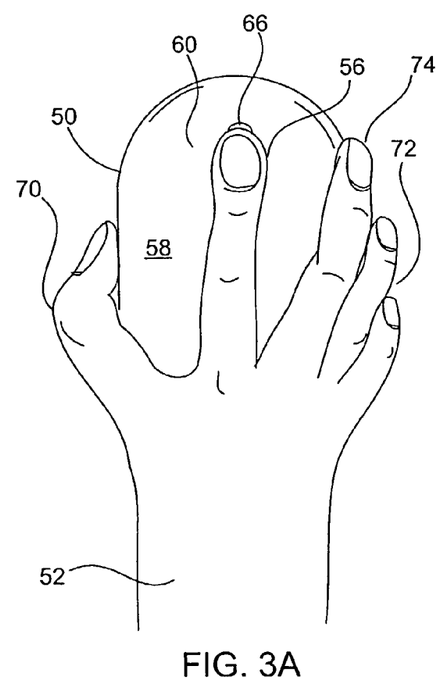
FIGS. 3A-3D show a peripheral input device in a vertical scrolling mode, in accordance with one embodiment of the present invention.
Figure 3B:
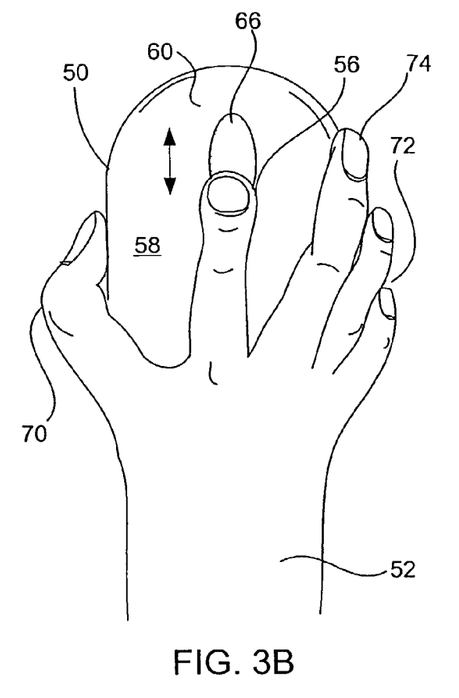
Figure 3C:
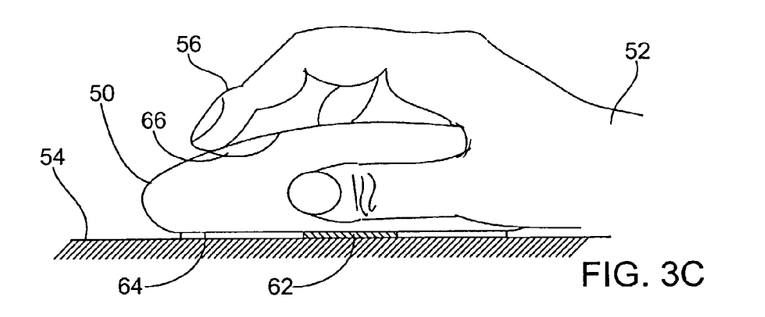
Figure 3D:
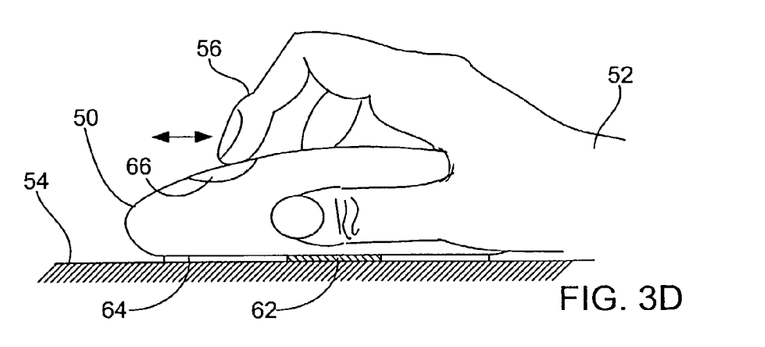
Figure 3E:
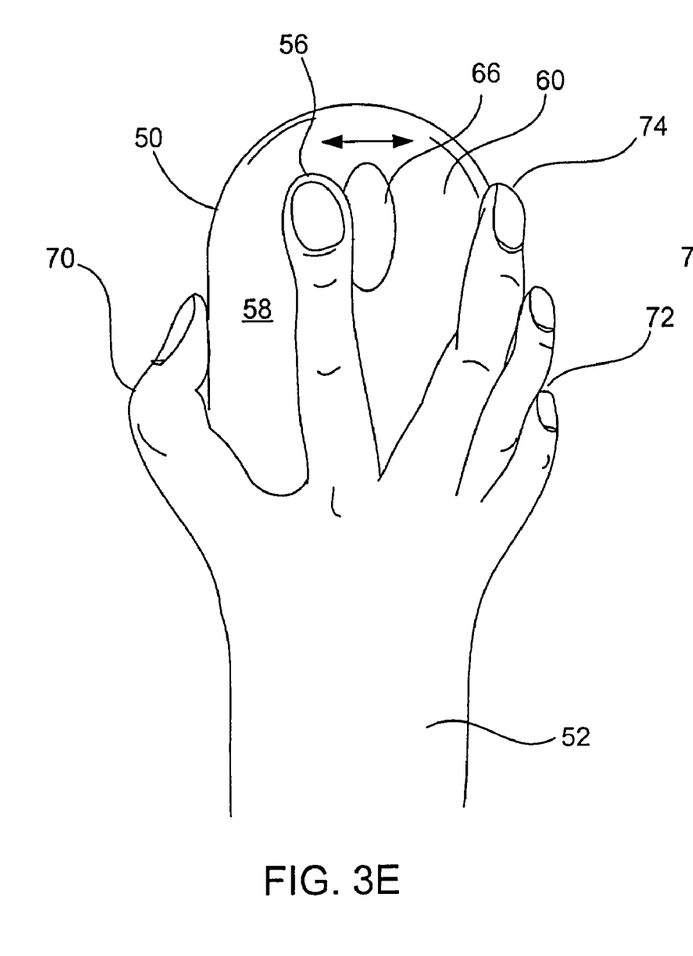
FIGS. 3E-3F show a peripheral input device in a horizontal scrolling mode, in accordance with one embodiment of the present invention.
Figure 3F:
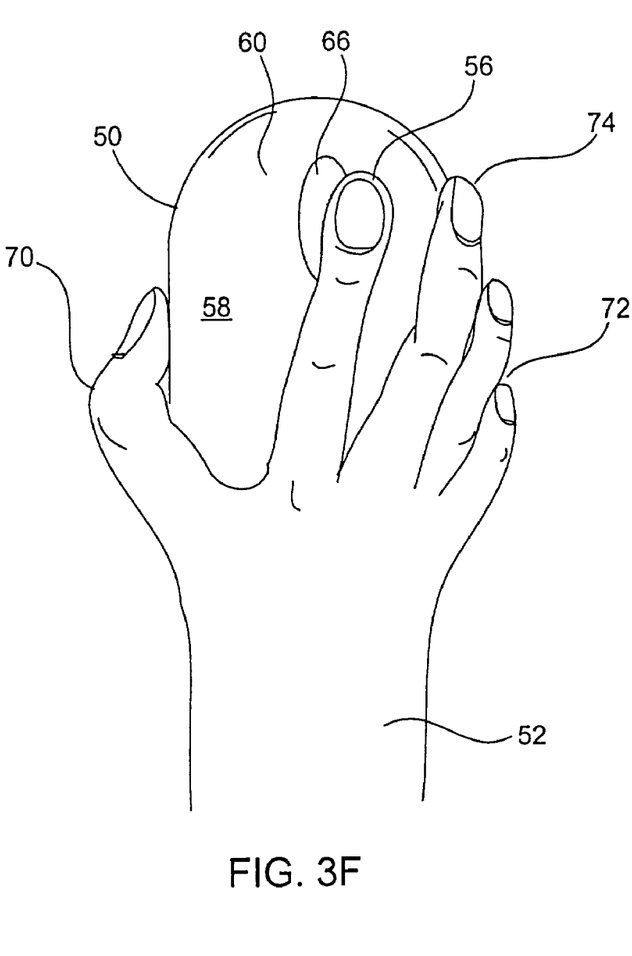

Referring to FIGS. 3A-3D, the vertical scroll control mode of the peripheral input device 50 is actuated when the user's finger is moved between the front of the scroll region 66 (as shown in FIGS. 3A and 3C) and the back of the scroll region 66 (as shown in FIGS. 3B and 3D). To elaborate, the palm side surface of the hand 52 is placed on the back portion of the device 50 and the thumb 70 and two rightmost fingers 72 (or leftmost fingers if left handed) are used to grip the sides of the mouse. The two remaining fingers 56 and 74 (either by themselves or in combination) are used to manipulate the scrolling region 66 (and buttons if included on the mouse). In the illustrated embodiment, the index finger 56 is used to implement scrolling through the scrolling region 66. In this particular embodiment, upward vertical scrolling is implemented when the index finger 56 is moved forwards away from the hand 52, and downwards vertical scrolling is implemented when the index finger 56 is moved backwards towards the hand 52.

Referring to FIGS. 3E-3F, the horizontal scroll control mode of the device 50 is actuated when the user's finger 56 is moved between the left side of the scroll region 66 (as shown in FIG. 3E) and the right side of the scroll region 66 (as shown in FIG. 3F). To elaborate, the palm side surface of the hand 52 is placed on the back portion of the device 50 and the thumb 70 and two rightmost fingers 72 (or leftmost fingers if left handed) are used to grip the sides of the device 50. The two remaining fingers 56 and 74 (either by themselves or in combination) are used to manipulate the scrolling region 66 (and buttons if included on the mouse). In the illustrated embodiment, the index finger 56 is used to implement scrolling through the scrolling region 66. In this particular embodiment, upward vertical scrolling is implemented when the index finger is moved forwards away from the hand. In this particular embodiment, right vertical scrolling is implemented when the index finger 56 is moved sideways towards the other fingers, and left horizontal scrolling is implemented when the index finger 56 is moved sideways towards the thumb.

It should be noted that the hand positions shown in FIGS. 3A-3F are by way of example and not by way of limitation. That is, the hand positions may vary according to each device or user of the device. For example, the scrolling region may be located on a different area of the mouse, and thus different fingers may be used to actuate the scrolling region. Furthermore, it should be appreciated that any portion of the hand may be used to initiate the scrolling region regardless of the position of the scrolling region on the mouse. By way of example, any of the fingers, as well as palm or back side of the hand may be used to initiate the scrolling region.

Furthermore, it should also be noted that the scrolling region is shown by way of example and not limitation. That is, the scrolling region is not limited to only horizontal and vertical movements. For example, the scrolling region may correspond to a panning region or a second cursor control region, both of which allow other movements such as diagonal.

Figure 4:
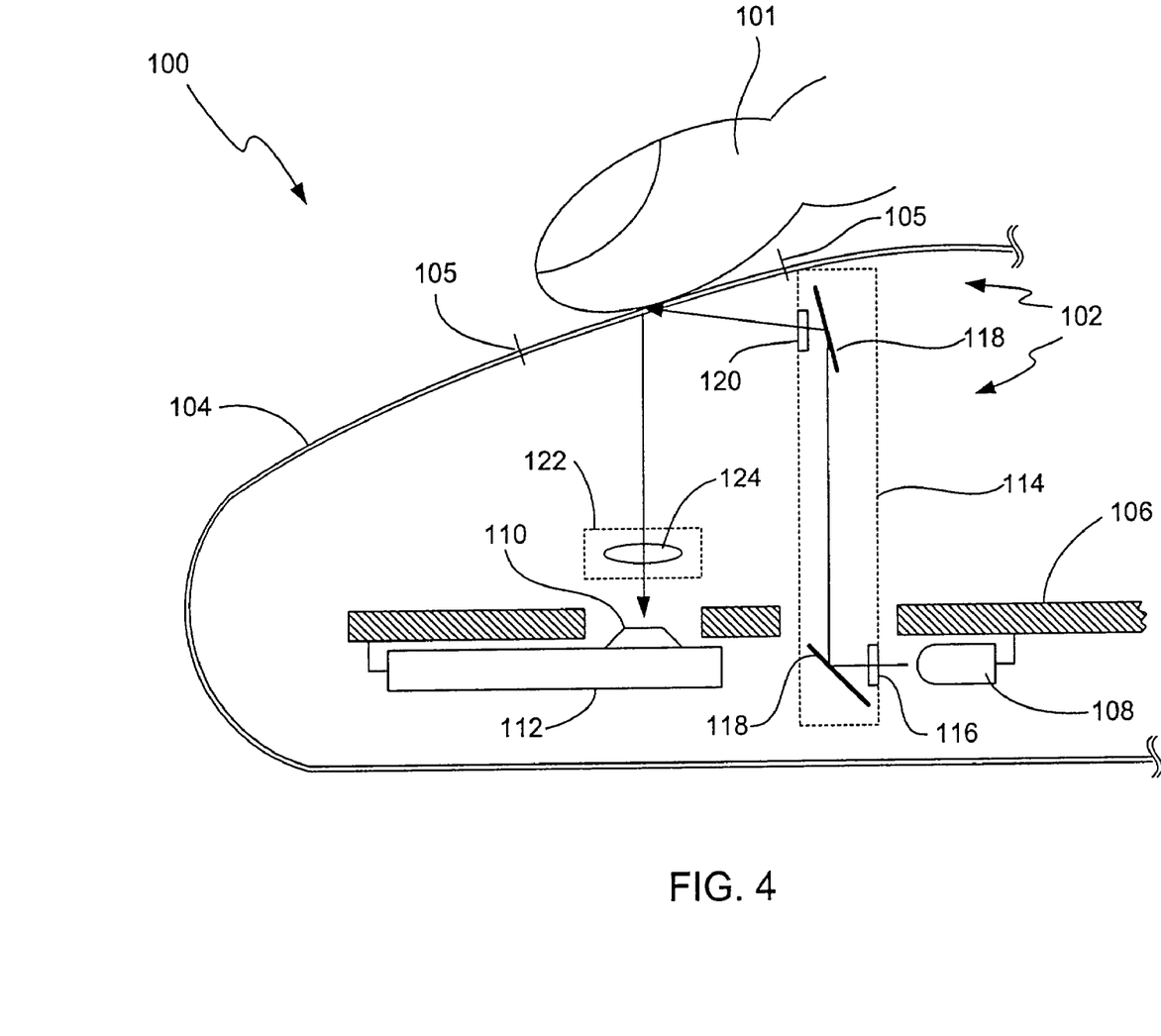
FIG. 4 is a broken away side view, in cross section, of a peripheral input device, in accordance with one embodiment of the present invention.

FIG. 4 is a broken away side view of a peripheral input device 100, in accordance with one embodiment of the present invention. By way of example, the peripheral input device 100 may generally correspond to any of the peripheral input devices shown herein. The peripheral input device 100 is configured with an optical touch pad 102 that is integrated directly with the housing 104 of the peripheral input device 100. By integrated directly, it is meant that the housing 104 serves as a portion of the optical touch pad 102. In the illustrated embodiment, the housing 104 serves as the operable optical window for the touch pad 102. The housing 104 is generally formed from a translucent or semi-translucent material that also provides strength and durability for protecting the internal components of the device 100. By way of example, the housing 104 may formed from a clear plastic material such as polycarbonate. Although a large portion of the housing 104 may be operable optically (e.g., translucent), the touch pad 102 generally defines a movement area 105 on the surface of the housing 104 for implementing GUI movements such as cursor or scroll movements. That is, the movement area 105 provides a boundary for forming the active portion of the touch pad 102.

As shown, the peripheral input device 100 includes a circuit board 106 to which the electronic components of the device are attached, as for example, the electronic components of the optical touch pad 102. The electronic components of the optical touch pad of FIG. 4 generally include a light source 108 and an image acquisition sensor 110 that work together to measure changes in finger position across the surface of the housing 104. In general, the light source 110 is configured to illuminate a portion of the housing 104, and the image acquisition sensor 110 is configured to acquire sequential surface images (e.g., multiple surface images per second) of the illuminated portion of the housing 104. In most cases, the illuminated area as well as the field of view of the image acquisition sensor 110 defines the movement area 105 of the touch pad 102. As should be appreciated, the image acquisition sensor 110 captures multiple images of the finger 101 as its moved across the movement area 105. These images may be used to determine the direction, position, speed, and acceleration of the moving (or stationary) finger. By way of example, the light source 108 may correspond to a light emitting diode (LED) such as a visible light LED or an infrared LED, and the image acquisition sensor 110 may correspond to a CMOS image sensor.

The image acquisition sensor 110 may be combined with other elements to form a bundled package. For example, it may be combined with elements that are configured to compare the most recent image to the past images to determine the direction, position, speed, and acceleration of finger movement, and/or elements that are configured to output this data to other devices. The elements may also be configured to drive the operation of the light source. By way of example, the image acquisition sensor may be operatively coupled to a microcontroller 112, which is capable of implementing those tasks. In one embodiment, the bundled image acquisition sensor corresponds to the HDNS-2000 or HDNS-2051 (or the like) Optical Mouse Sensors produced by Agilent of Palo Alto Calif. The HDNS-2000 Optical Mouse Sensor provides a non-mechanical tracking engine that measures changes in position by optically acquiring sequential surface images for 1500 times per second while mathematically determining the direction and magnitude of movement.

In order to effectively illuminate the housing 104, e.g., movement area 105, an optical system 114 may also be provided. The optical system 114 may be any device or devices that directs the light to the desired area. By way of example, the optical system 114 may correspond to a light conduit such as a light pipe or light guide or it may correspond to a combination of optical elements such as lens, mirrors, prisms and the like. In one embodiment, the optical system 114 is a specially designed optical component made in part with a light guiding material that directs light from the light source 108 to the housing 104.

In one implementation, the optical component 114 includes a light receiving area 116, one or more light directing areas 118, and a light output area 120. The light receiving area 116 is configured to transmit light from the light source 108 to the light directing areas 118. In most situations, the light receiving area 116 is positioned substantially adjacent to the light source 108 to efficiently couple light from the light source 108 to the light receiving area 116. The light directing areas 118 are arranged to direct the transmitted light from the light receiving area 116 to the light output area 120. The light output area 120 is positioned so as to direct light outward away from the optical component 114 and towards the housing 104 in the region of the movement areas 105. In this manner, when the light source 108 is transmitting light, the transmitted light illuminates the housing 104. In the illustrated embodiment, the optical system 114 is configured to direct the light from behind the PCB 106 where the light source 108 is located and onto the housing 104 in the region of the movement area 105. A second optical system 122 may be provided to help the image acquisition sensor 110 capture the image of the finger 101. For example, a lens 124 may be provided to focus the image onto the sensor 110. The first and second optical systems 114, 122 may be separate (as shown) or they may be combined into a single device.

Figure 5:
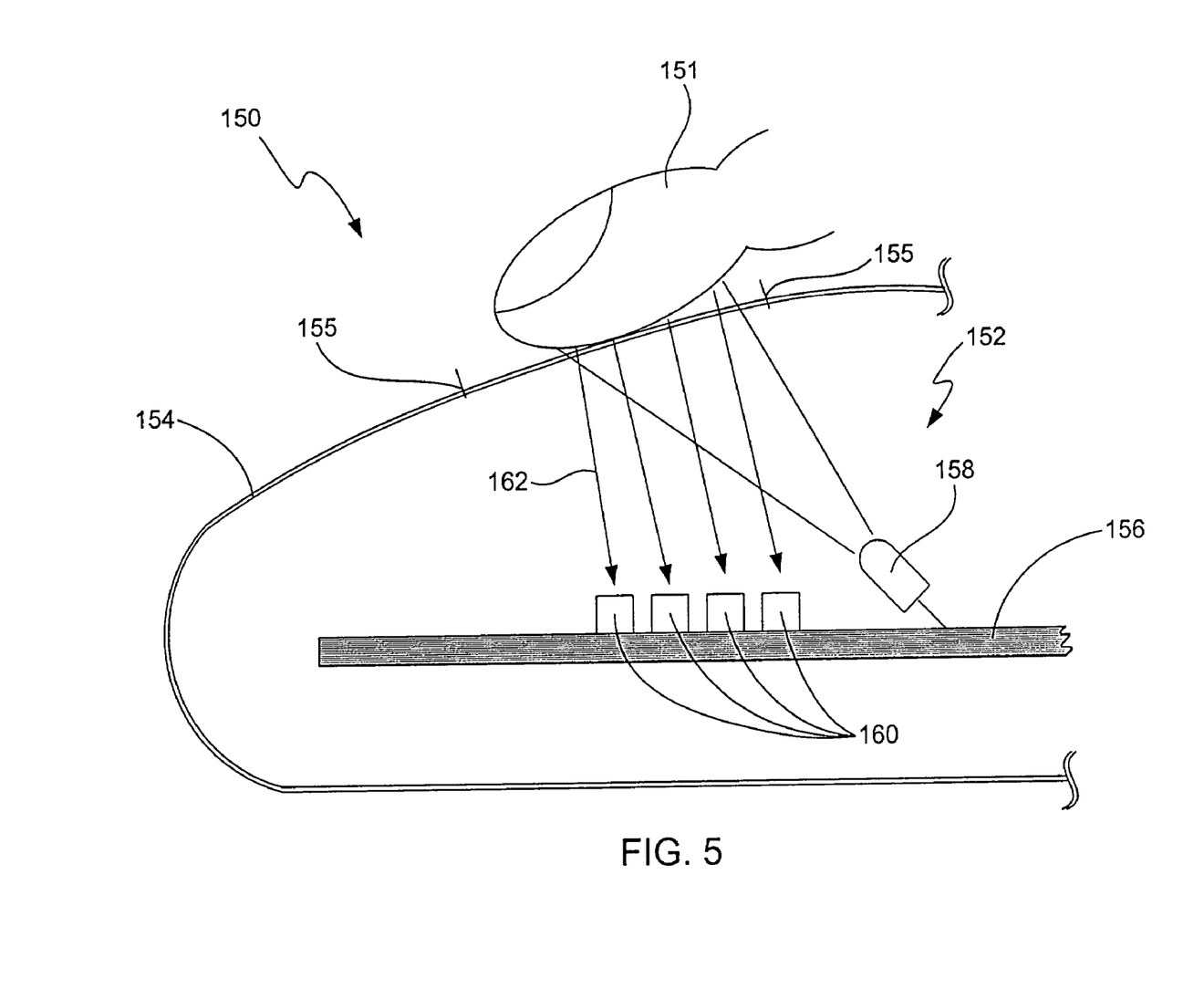
FIG. 5 is a broken away side view, in cross section, of a peripheral input device, in accordance with one embodiment of the present invention.

FIG. 5 is a broken away side view of a peripheral input device 150, in accordance with an alternate embodiment of the present invention. By way of example, the peripheral input device 150 may generally correspond to any of the peripheral input devices shown herein. The peripheral input device 150 is configured with an optical touch pad 152 that is integrated directly with the housing 154 of the peripheral input device 150. By integrated directly, it is meant that the housing 154 serves as a portion of the optical touch pad 152. In the illustrated embodiment, the housing 154 serves as the operable optical window for the touch pad 152. The housing 154 is generally formed from a translucent or semi-translucent material that also provides strength and durability for protecting the internal components of the device 150. By way of example, the housing 154 may formed from a clear plastic material such as polycarbonate. Although a large portion of the housing 154 may be operable optically (e.g., translucent), the touch pad 152 generally defines a movement area 155 on the surface for implementing GUI movements such as cursor or scroll movements. That is, the movement areas 155 provide a boundary for the active portion of the touch pad 152.

As shown, the peripheral input device 150 includes a circuit board 156 to which the electronic components of the device are attached, as for example, the electronic components of the optical touch pad 152. The electronic components of the optical touch pad of FIG. 5 generally include a light source or light emitter 158 and one or more light detectors 160 that work together to measure changes in finger position across the surface of the housing 154. The light emitter 158 is configured to shine light towards the housing 104 in the region of the movement area 155. The light detectors 160 are generally configured to measure the light intensity of the light 162 that is reflected off of the finger 151 when the finger 151 is positioned over the movement area 155. By way of example, the light source 108 may correspond to a IR emitter diode and the light detectors 160 may correspond to I-R detectors.

Accordingly, when the finger 51 (or other object) is present as shown, the light 162 is reflected to the light detectors 160. That is, the light 162 passes through the housing 154, and hits the finger 151 thus causing the light 162 to be reflected back through the housing 154 and onto the detector 160. When the finger 151 is moved, the reflected light 162 changes at each of the detectors thus altering the intensity of light at the detectors. When a substantial amount of light 162 is reflected back to the detector 160, the detectors 160 produce signals that may be used to determine the direction, position, speed and acceleration of the finger movement.

Figure 6:
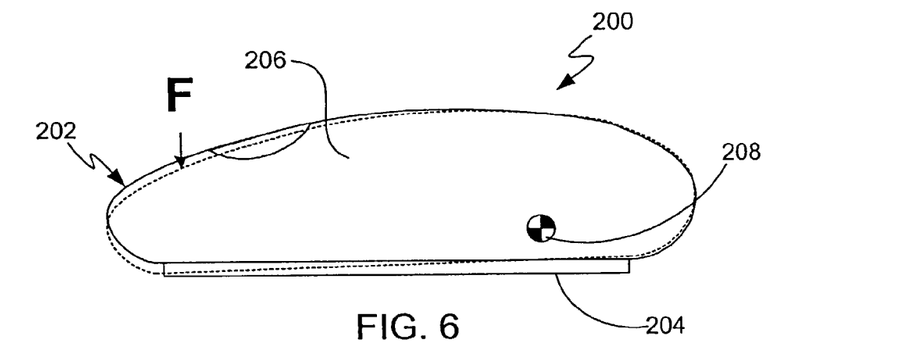
FIG. 6 is a side view of a mouse, in accordance with one embodiment of the present invention.
Figure 7:
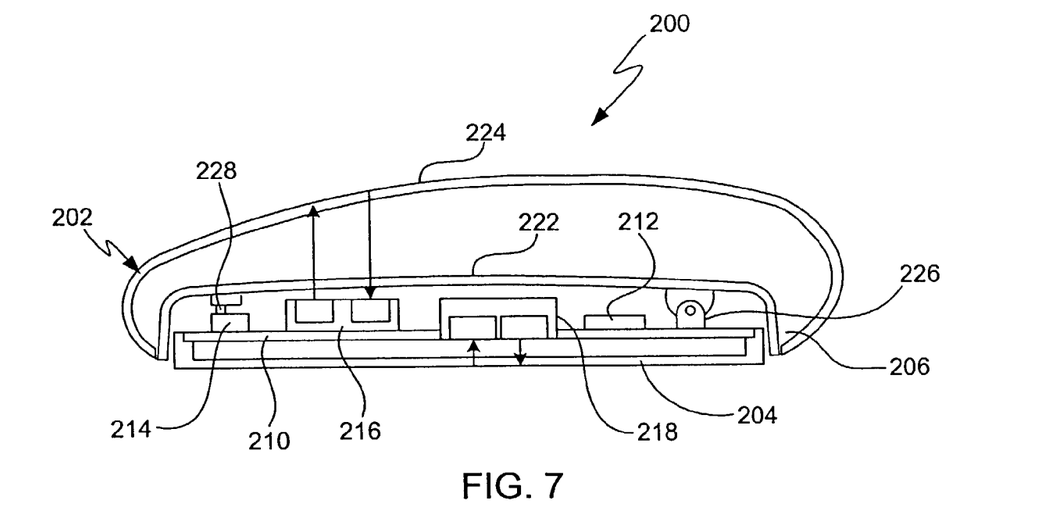
FIG. 7 is a side view, in cross section, of a mouse, in accordance with one embodiment of the present invention.

FIGS. 6 and 7 are side views of a unibody mouse 200, in accordance with one embodiment of the present invention. FIG. 7 is a cross sectional diagram of the mouse shown in FIG. 6. By way of example, the unibody mouse 200 may correspond to any of the device shown herein. The unibody mouse 200 generally includes a mouse housing 202 that provides a structure for moving the mouse along a surface, for gripping the mouse for movement thereof and for implementing at least one button function of the mouse 200. The term "unibody" herein refers to a mouse that integrates at least one button function directly into the mouse housing 202, i.e., pressing on the mouse housing 202 creates a clicking action. As such, any part of the hand, from finger to thumb to palm, can trigger a clicking action.

In one embodiment, the mouse housing 202 includes a base 204 and a button body 206. The base 204 is configured to moveably support the mouse 200 during use thereof, i.e., the base 204 makes moving contact with a surface such as a desktop or mouse pad. The button body 206, on the other hand, is configured to move relative to the base 204 so as to provide the clicking action, i.e., the entire surface of the body 206 above the base 204 acts as a single button. In the illustrated embodiment, the button body 206 is pivotable relative to the base 204, as for example, about pivot axis 208. As such, the body 206 is capable of moving between an unactuated position (shown by a solid line) and an actuated position (shown by a dotted line) when a force F is applied to the body 206. The force F may be any downward force on the mouse 200, whether from a finger, palm or hand that results in a clicking action.

The clicking action generally allows a user to perform an action on a display screen, as for example, making a selection in a GUI. For example, the clicking action may be used to implement a single click, a double click and/or a dragging and dropping function. As is generally well known, a single click often selects an item on the screen, a double click often opens a document or starts a program, and dragging and dropping generally makes it easy to move an item on the screen. In order to perform a single click using the mouse 200, the user presses and releases the body 206. In order to perform a double click using the mouse 200, the user quickly presses and releases the body 206 twice. In order to perform a drag and drop function, the user first positions the pointer or cursor over an item on the screen (by moving the mouse along the flat surface) and presses and holds down the body 206 so as to select the item. Thereafter, the user, while still holding down the body 206, moves the pointer to a desired position on the screen (by moving the mouse along the flat surface) and subsequently releases the body 206.

Referring to FIG. 7, the base 204 and button body 206 provide the mouse housing 202 for containing the electronics that generate control signals associated with controlling cursor movements, scrolling and performing actions on a display screen. By way of example, the electronics may include printed circuit boards (PCB) 210, processors 212, switches 214, position detection mechanisms 216 and 218, and the like. The base 204 and body 206 may also define the shape or form of the mouse 200. In the illustrated embodiment, a bottom side of the base 204 has an external contour (e.g., rectilinear) that substantially conforms to the contour of a flat surface such as a desktop and a top side of the mouse housing 202 has an external contour that substantially conforms to the contour of the inside surface of a hand (e.g., curved). As shown, the button body 206 represents a substantial portion of the entire mouse housing 202.

More specifically, the body 206 includes an inner shell 222 and an outer shell 224. The outer shell 224 is structurally coupled to the inner shell 222. The means for coupling the outer shell 224 to the inner shell 222 is not shown herein, however, any suitable coupling means may be used. By way of example, the outer shell 224 may be coupled to the inner shell 222 via fasteners such as snaps, screws, glues and the like. Alternatively, the inner and outer shell 222, 224 may be integrally formed from a single piece of material. The inner and outer shells 222, 224, as well as the base 204, are generally formed from a suitable material such as plastic. In one implementation, the inner and outer shell 224 are formed from an optically transmissive material. As shown, the inner shell 222 is disposed between the base 204 and the outer shell 224. In one embodiment, the inner shell 222 is configured to cover the electronic components disposed on the PCB 210.

The inner shell 222 is pivotally coupled to the base 204 via a pivot 226 located towards the rear of the mouse 200. By way of example, the pivot 226 may include a pivot support attached to the base 204, and the inner shell 222 may include an internal pivot pin for mating with an opening in the pivot support. The pivot 226 allows the body 204 to swing between an unclicked position, placing the body 206 away from the base 204, and a clicked position, placing the body 206 towards the base 204. In the clicked position (e.g., when a downward force is applied to the body 204), the inner shell 222 is configured to engage the switch 214, which is mounted on the PCB 210 and which is located opposite the pivot 226. That is, during the clicking action, a bottom portion of the inner shell 222 is pushed against an actuator 228 of the switch 214 thereby activating the switch 214, i.e., the actuator 228 is configured to move between a deactivate position (e.g., upright) and an activate position (e.g., depressed). When activated, a command signal such as a data selection or execution command signal is sent to a computer. By way of example, the signal may be sent through a cable (not shown) that is connected to the internal electronics housed within the mouse 200. In one embodiment, a spring mechanism is used to bias the inner shell 222 in a direction away from the base 204, i.e., in the un-clicked position (as shown). By way of example, the spring mechanism may be part of the switch 214, i.e., the actuator 228 may be biased in the upright position, or it may be a separate spring pad connected to the base 204.

Also mounted on the PCB 210, are the first position detection mechanism 216 and the second position detection mechanism 218. The first position detection mechanism 216 is configured to track (as shown by arrows) the position of a finger moving across the mouse 200 (e.g., outer shell 224). The second position mechanism 218 is configured to track the position of the mouse 200 (e.g., base 204) moving across a surface. Each of the position detection mechanisms produces a separate positional signal for making movements on a display screen. The movements may be widely varied. For example, the movements may correspond to cursor movements, scrolling movements, panning movements and the like. In the illustrated embodiment, the first position detection 216 is configured to implement scrolling when a finger is moved across the mouse 200, and the second position mechanism 218 is configured to move a cursor when the mouse 200 is moved along a surface. The position detection mechanisms may be widely varied. For example, the position detecting mechanisms may be a mechanical mechanism such as a trackball or an optical mechanism such as an optical sensor. In the illustrated embodiment, the first and second position detection mechanisms 216, 218 are optical sensor arrangements. As shown, the optically transmissive inner and outer shells 222, 224 allow the optical sensors of the first position mechanism 216 to work therethrough. Alternatively, the first position detection mechanism 216 may be located above the inner shell 222, between the inner shell 222 and the outer shell 224. In cases such as these, the inner shell 222 may be formed from an opaque material.

In one embodiment, the first position mechanism 216 is dedicated to controlling a first GUI movement and the second position detection mechanism 218 is dedicated to controlling a second GUI movement that is different than the first GUI movement. For example, the first position detection mechanism 216 may be dedicated to controlling a scrolling or panning feature and the second position detection mechanism 218 may be dedicated to controlling movements of a cursor. Accordingly, the user may move the mouse 200 to move the cursor and move his or her finger to scroll on a display screen.

Although not shown, the switch 214, and position detection mechanisms 216, 218 are operatively coupled to the processor 212. The processor 212 generally provides control functions for the mouse 200. For example, the processor 212 may be used to interpret data gathered from the switch 214 and position detection mechanisms 216, 218. The processor 212 may also be used to transmit the results of the data to a host device. For example, the first position detection mechanism 216 via the optical sensor may detect finger movement, and send electrical signal to the processor 212, and the processor 212 may send out the movement information to a host system.

Figure 8:
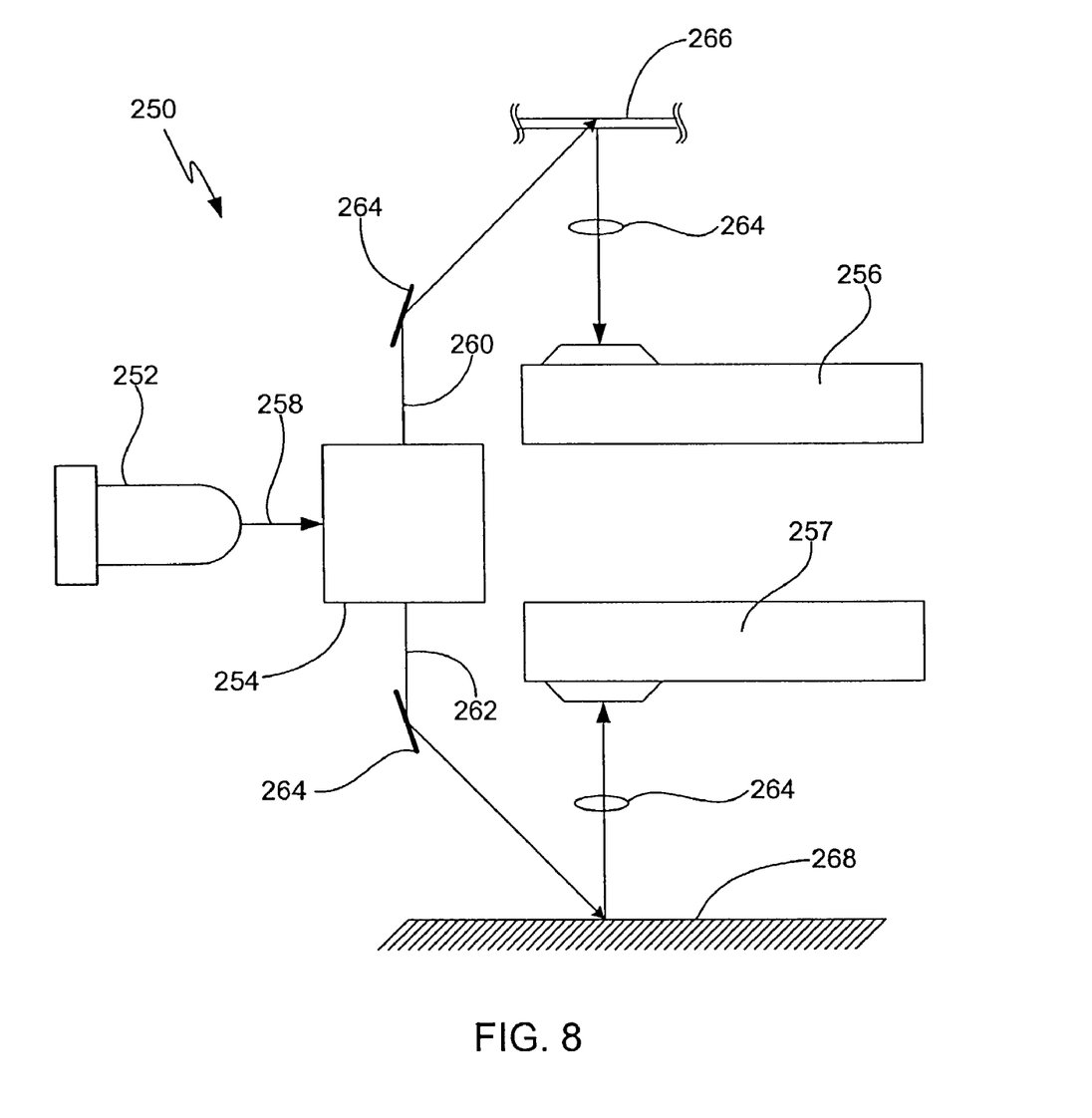
FIG. 8 is a simplified diagram of a dual position detection mechanism, in accordance with one embodiment of the present invention.

FIG. 8 is a simplified block diagram of a dual position detection mechanism 250, in accordance with one embodiment of the present invention. As shown, the dual position detection mechanism 250 includes a single light source 252, a beam splitter system 254 and a pair of optical sensors 256, 257. In this embodiment, the light 258 from the light source is split into multiple beams 260, 262 via the beam splitter arrangement 254. Each of the split beams 260, 262 is used with one of the distinct optical sensors 256, 257. That is, the light 258 entering the beam splitter arrangement 254 is split into two distinct beams 260, 262. Each of these beams follows a different optical path corresponding to each of the optical sensors 256, 257. For example, the first optical path may correspond to the first optical sensor 256, and the second optical path may correspond to the second optical sensor 257. In one embodiment, the light source is an LED and the optical sensors are image acquisition sensors such as CMOS image sensors. The beam splitter arrangement may be widely varied. In general, its any optical component (or components) that can split a single beam into two distinct beams. For example, the beam splitter arrangement may include a beam splitter cube, diffraction grating or the like, as well as other optical components for splitting the beam. The dual position detection mechanism 250 may also include other optical components 264 for directing each of the split beams 260, 262 to a desired area. By way of example, light conduits such as light pipes or light guides may be used. In one embodiment, the first optical sensor 256 is configured to detect finger positions relative to an operable optical window 266, and the second optical sensor 257 is configured to detect device positions relative to a surface 268, as for example, the configuration shown in FIGS. 6 and 7.

It should be noted that the position detection mechanism shown in FIG. 8 is not a limitation and that more than two beams may be split away from a single beam.

The advantages of the invention are numerous. Different embodiments or implementations may have one or more of the following advantages. One advantage of the invention is that it requires no obvious button to actuate a GUI movement. Buttons break the surface of the housing and are therefore less aesthetically pleasing. For example, there is no need for a cutout at the housing nor a mechanical component to protrude out of the device. Another advantage of the invention is that the user implements the GUI movements by a simple and natural posture change of the hand and is not required to hold down a button. For example, the invention provides scrolling with very little force (almost zero) exerted by the finger on the scroll area of the device. In contrast, convention devices have mechanical components that require some amount of force to be applied by the finger, as for example, in the form of a pushing action to rotate a wheel or to activate a switch. Another advantage of the invention is that it allows an intuitive way to scroll on a display screen. For example, the user can manipulate his or her finger side to side for horizontal scrolling and backwards/forwards for vertical scrolling.

While this invention has been described in terms of several preferred embodiments, there are alterations, permutations, and equivalents, which fall within the scope of this invention. For example, a switch may be provided to activate the optical touch pad and deactivate the second position detection mechanism (or vice versa) so that scrolling and cursor movements are not active simultaneously. The switch may be a separate switch, or it may be built into the two devices, i.e., activates which ever mechanism is being used, if both are being used only activates the one that was initiated first. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A mouse for use in a computer system having a display screen, the mouse comprising:
    a first position detection mechanism configured to track the position of a finger moving across an outer surface of the mouse and to generate signals for controlling movements on the display screen; and
    a second position detection mechanism configured to track the position of the mouse moving across a surface and to generate signals for controlling movements on the display screen,
    wherein each of the position detection mechanisms includes an optical sensor and wherein the position detection mechanisms share a light source, the light source cooperating with each of the optical sensors.

2. The mouse as recited in claim 1 wherein the first position detection mechanism generates signals for controlling a first movement on the display screen, and wherein the second position detection mechanism generates signals for controlling a second movement, the first movement being different than the second movement.

3. The mouse as recited in claim 2 wherein the first movement corresponds to a scrolling movement, and wherein the second movement corresponds to a cursor movement.

4. The mouse as recited in claim 1 wherein each of the position detection mechanism includes a microcontroller.

5. The mouse as recited in claim 1 further including a housing that includes a base for moveably supporting the mouse on a surface and a body carried by the base for allowing the mouse to be held by the user.

6. The mouse as recited in claim 5 wherein the first position detection mechanism includes an optical sensor and wherein the body is formed from a translucent material thereby allowing the first position detection mechanism to work therethrough.

7. The mouse as recited in claim 5 wherein the body is movably coupled to the base so as to provide one or more clicking actions for performing actions on the display screen.

8. The mouse as recited in claim 5 wherein the mouse includes a mechanical button that is disposed in the body, the mechanical button providing one or more clicking actions for performing actions on the display screen.

9. The mouse as recited in claim 1 further including a processor operatively coupled to each of the position detection mechanisms.

10. A mouse for controlling movements on a display screen, the peripheral input device comprising:
  a housing for enclosing internally various electrical components associated with the mouse;
  a position detection mechanism carried by the housing, the position detection mechanism being configured to translate housing motion into movements on the display screen;
  an optical touch pad carried by the housing, the optical touch pad being configured to translate finger motion into movements on the display screen, the optical touch pad including an optically operable window that is a portion of the housing of the mouse, and an optical system that is located within the housing and configured to work through the optically operable window so as to detect movements of a finger in close proximity to and moving across the optically operable window, the optical system including a single light source and one or more optical sensors so that they can detect movements of a finger in close proximity to and moving across the optically operable window by receiving light reflected directly from the finger through the optically operable window, wherein the light source is a light emitter configured to shine light towards the optically operable window, and the optical sensors are light detectors configured to measure the light intensity of the light that is reflected off an object located at the optically operable window.

11. A mouse for controlling movements on a display screen, the peripheral input device comprising:
  a housing for enclosing internally various electrical components associated with the mouse;
  a position detection mechanism carried by the housing, the position detection mechanism being configured to translate housing motion into movements on the display screen;
  an optical touch pad carried by the housing, the optical touch pad being configured to translate finger motion into movements on the display screen, the optical touch pad including an optically operable window that is a portion of the housing of the mouse, and an optical system that is located within the housing and configured to work through the optically operable window so as to detect movements of a finger in close proximity to and moving across the optically operable window, the optical system including a single light source and one or more optical sensors so that they can detect movements of a finger in close proximity to and moving across the optically operable window by receiving light reflected directly from the finger through the optically operable window; and
  an audio feedback device that provides audio feedback to the user at the rate at which an object is moved across the optically operable window.

12. A mouse for controlling movements on a display screen, the peripheral input device comprising:
  a housing for enclosing internally various electrical components associated with the mouse;
  a position detection mechanism carried by the housing, the position detection mechanism being configured to translate housing motion into movements on the display screen;
  an optical touch pad carried by the housing, the optical touch pad being configured to translate finger motion into movements on the display screen, the optical touch pad including an optically operable window that is a portion of the housing of the mouse, and an optical system that is located within the housing and configured to work through the optically operable window so as to detect movements of a finger in close proximity to and moving across the optically operable window, the optical system including a single light source and one or more optical sensors so that they can detect movements of a finger in close proximity to and moving across the optically operable window by receiving light reflected directly from the finger through the optically operable window, wherein the optically operable window is located above a printed circuit board enclosed within the housing of the mouse, the light source and optical sensors are mounted on a bottom side of a printed circuit board, and the printed circuit board includes one or more openings through which the light source and optical sensors optically communicate with the scrolling region.

13. A mouse for controlling movements on a display screen, the peripheral input device comprising:
  a housing for enclosing internally various electrical components associated with the mouse;
  a position detection mechanism carried by the housing, the position detection mechanism being configured to translate housing motion into movements on the display screen; and
  an optical touch pad carried by the housing, the optical touch pad being configured to translate finger motion into movements on the display screen, the optical touch pad including an optically operable window that is a portion of the housing of the mouse, and an optical system that is located within the housing and configured to work through the optically operable window so as to detect movements of a finger in close proximity to and moving across the optically operable window, the optical system including a single light source and one or more optical sensors so that they can detect movements of a finger in close proximity to and moving across the optically operable window, wherein the optically operable window is located above a printed circuit board enclosed within the housing of the mouse, the light source and optical sensors are mounted on a bottom side of a printed circuit board, and the printed circuit board includes one or more openings through which the light source and optical sensors optically communicate with the scrolling region.

14. The mouse as recited in claim 13 wherein the housing is formed from a translucent material.

15. The mouse as recited in claim 13 wherein the optical sensor is an image acquisition sensor capable of capturing images of the finger as its moved across the optically operable window.

16. The mouse as recited in claim 13 wherein the optical sensor is a light detector capable of measuring the intensity of light reflecting off the finger as the finger is moved across the optically operable window.

17. The mouse as recited in claim 13 wherein the optical sensor is coupled to a controller that interprets the data collected by the optical sensor, and that reports this information to a host system.

18. The mouse as recited in claim 13 wherein the light source is a light emitter configured to shine light towards the optically operable window, and the optical sensors are light detectors configured to measure the light intensity of the light that is reflected off an object located at the optically operable window.

19. The mouse as recited in claim 13 wherein housing is formed from an optically transmissive material.

20. The mouse as recited in claim 13 wherein the optical system includes one or more light sources and one or more optical sensors, the number of optical sensors being greater than the number of light sources.

21. The mouse as recited in claim 13 wherein the optical system includes a single light source and one or more optical sensors.

22. A mouse for controlling movements on a display screen, the peripheral input device comprising:
   a housing for enclosing internally various electrical components associated with the mouse;
   a position detection mechanism carried by the housing, the position detection mechanism being configured to translate housing motion into movements on the display screen;
   an optical touch pad carried by the housing, the optical touch pad being configured to translate finger motion into movements on the display screen, the optical touch pad including an optically operable window that is a portion of the housing of the mouse, and an optical system that is located within the housing and configured to work through the optically operable window so as to detect movements of a finger in close proximity to and moving across the optically operable window, the optical system including a single light source and one or more optical sensors so that they can detect movements of a finger in close proximity to and moving across the optically operable window; and
   an audio feedback device that provides audio feedback to the user at the rate at which an object is moved across the optically operable window.

23. A mouse for controlling movements on a display screen, the peripheral input device comprising:
   a housing for enclosing internally various electrical components associated with the mouse;
   a position detection mechanism carried by the housing, the position detection mechanism being configured to translate housing motion into movements on the display screen;
   an optical touch pad carried by the housing, the optical touch pad being configured to translate finger motion into movements on the display screen, the optical touch pad including an optically operable window that is a portion of the housing of the mouse, and an optical system that is located within the housing and configured to work through the optically operable window so as to detect movements of a finger in close proximity to and moving across the optically operable window, the optical system including a single light source and one or more optical sensors so that they can detect movements of a finger in close proximity to and moving across the optically operable window, wherein the optical touch pad includes one or more optical components that help direct the light between the light source and the optical sensor; and
   a light guide that directs light from the light source to the housing at the scrolling region, and a lens that helps direct light from the housing at the scrolling region to the optical sensors.

24. A mouse for controlling movements on a display screen, the peripheral input device comprising:
   a housing for enclosing internally various electrical components associated with the mouse;
   a position detection mechanism carried by the housing, the position detection mechanism being configured to translate housing motion into movements on the display screen; and
   an optical touch pad carried by the housing, the optical touch pad being configured to translate finger motion into movements on the display screen, the optical touch pad including an optically operable window that is a portion of the housing of the mouse, and an optical system that is located within the housing and configured to work through the optically operable window so as to detect movements of a finger in close proximity to and moving across the optically operable window, the optical system including a single light source and one or more optical sensors so that they can detect movements of a finger in close proximity to and moving across the optically operable window, wherein the light source is a light emitter configured to shine light towards the optically operable window, and the optical sensors are light detectors configured to measure the light intensity of the light that is reflected off an object located at the optically operable window.

25. The mouse as recited in claim 24 wherein the optical sensor is coupled to a controller that interprets the data collected by the optical sensor, and that reports this information to a host system.

26. The mouse as recited in claim 24 wherein the optical system includes one or more light sources and one or more optical sensors, the number of optical sensors being greater than the number of light sources.

27. The mouse as recited in claim 24 wherein the housing is gripped by a user during manipulation of the peripheral input device.

28. The mouse as recited in claim 24 wherein the optical system includes a single light source and one or more optical sensors.

29. The mouse as recited in claim 24 wherein the optical sensor is a light detector capable of measuring the intensity of light reflecting off the finger as the finger is moved across the optically operable window.

30. The mouse as recited in claim 24 further including one or more buttons configured to provide a clicking action for performing actions on the display screen.

31. The mouse as recited in claim 30 wherein the one or more buttons correspond to a mechanical button that works through the housing.

32. The mouse as recited in claim 30 wherein the one or more buttons correspond to a unified button/housing that incorporates the functionality of the button directly into the housing.

33. The mouse as recited in claim 24 wherein the optically operable window is located above a printed circuit board enclosed within the housing of the mouse, the light source and optical sensors are mounted on a top side of the printed circuit board.

34. The mouse as recited in claim 24 wherein the optically operable window makes up a substantial portion of the housing.

35. The mouse as recited in claim 34 wherein housing is formed from an optically transmissive material.

36. The mouse as recited in claim 35 wherein the housing is formed from a translucent material.

37. The mouse as recited in claim 24 wherein the light source is a light emitting diode.

38. The mouse as recited in claim 24 further including a position detection mechanism carried by the housing, the position detection mechanism being configured to perform additional movements on the display screen.

39. The mouse as recited in claim 38 wherein the position detection mechanism is configured to translate finger motion or housing motion into movements on the display screen.

40. The mouse as recited in claim 38 wherein the movements controlled by the optical touch pad are different than the movements controlled by the position detection mechanism.

41. The mouse as recited in claim 40 wherein the movements controlled by the optical touch pad correspond to scrolling movements and wherein the movements controlled by the position detection mechanism correspond to cursor movements.

42. The mouse as recited in claim 24 wherein the light source is a light emitting diode and the optical sensor is an image acquisition sensor.

43. The mouse as recited in claim 24 wherein the optical sensor is an image acquisition sensor capable of capturing images of the finger as its moved across the optically operable window.

44. The mouse as recited in claim 43 wherein the image acquisition sensor is a CMOS image sensor.

45. The mouse as recited in claim 24 wherein the peripheral input device is a mouse, wherein the housing forms a portion of the mouse housing, and wherein the mouse housing provides a structure for moving the mouse along a surface, for gripping the mouse for movement thereof and for implementing at least one button function of the mouse.

46. The mouse as recited in claim 45 wherein the mouse is a unibody mouse, wherein the mouse housing includes a base and a button body that encloses the optical sensor, the base being configured to moveably support the mouse during use thereof, the button body being configured to move relative to the base so as to provide a clicking action, and wherein the button body includes the optically operable window.

* * * * *